(12) United States Patent
Akopian

(10) Patent No.: US 6,810,072 B1
(45) Date of Patent: Oct. 26, 2004

(54) SYSTEM FOR ACQUIRING SPREAD SPECTRUM SIGNALS

(75) Inventor: David Akopian, Tampere (FI)

(73) Assignee: Nokia Corporation, Espoo (FI)

( * ) Notice: Subject to any disclaimer, the term of this patent is extended or adjusted under 35 U.S.C. 154(b) by 731 days.

(21) Appl. No.: 09/580,155

(22) Filed: May 30, 2000

(51) Int. Cl.$^7$ ............................. H04B 1/69; G01S 0/00
(52) U.S. Cl. ..................... 375/143; 375/149; 342/357
(58) Field of Search ..................... 375/143, 149–344, 375/357.06; 370/209–335; 342/378, 357.06

(56) References Cited

U.S. PATENT DOCUMENTS

| | | | |
|---|---|---|---|
| 5,272,446 A | | 12/1993 | Chalmers et al. |
| 5,799,010 A | * | 8/1998 | Lomp et al. ............... 370/335 |
| 6,222,874 B1 | * | 4/2001 | Walley et al. ............. 375/149 |
| 6,259,400 B1 | * | 7/2001 | Higgins et al. ........ 342/357.06 |
| 6,289,041 B1 | * | 9/2001 | Krasner ..................... 375/152 |
| 6,426,949 B1 | * | 7/2002 | Zhou et al. ................ 370/342 |
| 6,577,271 B1 | * | 6/2003 | Gronemeyer .............. 342/378 |
| 6,577,674 B1 | * | 6/2003 | Ko et al. .................... 375/148 |

FOREIGN PATENT DOCUMENTS

WO        9859446        12/1998

OTHER PUBLICATIONS

A Unified Approach to Serial Search Spread–Spectrum Code Acquisition—Part II: A Matched–Filter Receiver Polydoros, A.; Weber, C.; Communications, IEEE Transactions on [legacy, pre—1988], vol.: 32, Issue: 5, May 1984 pp.: 550–560.*

Unified Approach to Serial Search Spread–Spectrum Code Acquisition—Part I: General Theory Polydoros, A.; Weber, C.; Communications, IEEE Transactions on [legacy, pre—1988], vol.: 32, Issue: 5, May 1984 pp.: 542–549.*

Spread–spectrum code acquisition in the presence of Doppler shift and data modulation; Cheng, U.; Hurd, W.J.; Statman, J.I.; Communications, IEEE Transactions on, vol.: 38, Issue: 2, Feb. 1990 pp.: 241–250.*

Spread–spectrum signal acquisition: Methods and technology; Rappaport, S.; Grieco, D.; Communications Magazine, IEEE, vol.: 22, Issue: 6, Jun. 1984, pp. 6–21.*

* cited by examiner

Primary Examiner—Stephen Chin
Assistant Examiner—Cicely Ware
(74) Attorney, Agent, or Firm—Ware, Fressola, Van Der Sluys & Adolphson LLP

(57) ABSTRACT

An apparatus, system, and corresponding method for acquiring a spread spectrum signal, where the acquiring includes matching the phase of a replica of a code component to the phase of the received code component and also determining the carrier frequency including any Doppler or other shifting, the apparatus including: a multi-section matched filter for providing successive section outputs each including elements corresponding to a different replica code phase; and a compensated acquisition module, responsive to each section output of each of the sections, for providing a sequence of frequency indicators, each corresponding to a different frequency offset, with each section output having elements each of which corresponds to a particular value of replica code phase, wherein each frequency indicator is based on a combining, phase element-wise, of the section outputs using compensating factors that depend on the corresponding frequency offset.

28 Claims, 12 Drawing Sheets

SYSTEM FOR ACQUIRING SPREAD SPECTRUM SIGNALS

FIELD OF THE INVENTION

This method relates, in general, to CDMA (Code Division Multiple Access) spread spectrum receivers, and more specifically, to signal acquisition techniques by such receivers.

BACKGROUND OF THE INVENTION

Spread spectrum communication in its basic form is a method of taking a data signal that is used to modulate a sinusoidal carrier and then spreading its bandwidth to a much larger value, e.g. in a Global Positioning System (GPS) application, effectively multiplying a single-frequency carrier by a highrate binary (−1,1) pseudo-random noise (PRN) code sequence that is known to GPS users. Thus, the signal that is transmitted includes a data component, a PRN component, and a (sinusoidal) carrier component.

At the receiver, a synchronized replica of the transmitted PRN code is required to de-spread the data sequence. Initial synchronization, called acquisition, is followed by fine synchronization, which is called tracking.

The present invention relates only to acquisition, not tracking. Acquisition is the process by which, for the first time or after losing an acquired signal, the replica PRN code is synchronized (to within a small timing offset) with the code conveyed by the received signal and, in addition, the carrier frequency of the received signal is determined. Thus, the process of acquisition must determine any frequency-shifting of the received signal to allow for an accurate wipeoff of the carrier signal. The frequency-shifting includes Doppler-shifting as well as differences in frequencies because of clock inaccuracies. Satellite motion relative to the receiver causes a Doppler shift of the carrier frequency, which results in a modulation of a code component after carrier wipe-off in a GPS receiver. The replica code sequence must not only be time-aligned with the received code sequence, but also modulated to compensate for the frequency shifting to fully eliminate the PRN sequence and leave behind only the data conveyed by the received signal. Thus the acquisition is a two-dimensional search in code phase and frequency domain.

For GPS signals the search interval in the frequency domain can be as large as 12 kHz, i.e. the search interval can be as much as +/−6 kHz about a nominal carrier frequency. In addition, the code phase can be any possible value of code phase, due to uncertainties in position of the satellite and time of transmission of the received signal. A PRN code is typically 1023 chips (bits of code, as opposed to bits of data) in length (before repeating). Thus, the acquisition module of a receiver must search a 12 kHz wide interval with $1023 \times k_s$ different code phases, where $k_s$ denotes the number of samples per chip.

Ordinary GPS receivers designed only for operation with unobstructed satellites search for the frequency shift with a granularity of 1 kHz. Thus, such receivers must search $12 \times k_s \times 1023$ different code/frequency combinations.

A GPS receiver designed for indoor operation must have an operating mode with equivalent noise bandwidth of approximately 50 Hz in the acquisition stage. Even with a 50 Hz bandwidth though, some post-detection filtering must be performed as well as further refining of the frequency for reliable tracking. The granularity of 50 Hz requires that the receiver search $240 \times k_s \times 1023$ different code/frequency combinations, and makes the sequential search a time-consuming task, motivating the use of parallel and fast search methods.

What is needed is a way of performing the code/frequency search in a way that is computationally efficient and also accurate.

SUMMARY OF THE INVENTION

Accordingly, the present invention provides an apparatus, a system, and a corresponding method for acquiring a spread spectrum signal that includes a carrier component at a carrier frequency, a code component, and a data component, where the acquiring includes matching the phase of a replica of the code component to the phase of the received code component and also determining the carrier frequency including any shifting of the carrier frequency. The apparatus includes: a multi-section matched filter having a plurality of sections, the multi-section matched filter being responsive to a signal derived from the spread spectrum signal by a sequence of processing steps including mixing the spread spectrum signal with a first frequency, for providing successive section outputs for each section, each section output of each section including elements corresponding to a different replica code phase; and a compensated acquisition module, responsive to each section output of each of the sections, for providing a sequence of second frequency indicators, each second frequency indicator corresponding to a different frequency offset in a group of frequency offsets from the first frequency, and each section output having elements each of which corresponds to a particular value of replica code phase, wherein each second frequency indicator is based on a combining, phase element-wise, of the section outputs using compensating factors that depend on the corresponding frequency offset.

In a further aspect of the invention, the combining using compensating factors is a combining of the section outputs for only one code period.

In a further aspect of the invention, the combining using compensating factors is a coherent combining of more than one code period of the section outputs, the term coherent combining being used to indicate a combining of terms in which the phase or sign of the terms is taken into account.

In another, further aspect of the invention, the apparatus also includes an analysis module, responsive to the sequence of second frequency indicators, for providing a replica code phase and a corrected carrier frequency.

In still another, further aspect of the invention, the combining using compensating factors is coherent combining, and in a further aspect, the compensated acquisition module includes: a coherent combining module, responsive to the section outputs, for combining the section outputs a plurality of times, each combination using different compensating factors based on a frequency offset selected from the group of frequency offsets, to provide one or more successive groups of sequences of compensated sums; and a non-coherent combining module, responsive to the one or more groups of sequences of compensated sums, for accumulating, frequency offset-wise, the magnitudes of each element of the one or more successive groups of compensated sums.

In still another, further aspect of the invention, the multi-section matched filter and the compensated acquisition module are co-located in a receiver.

In yet still another, further aspect of the invention, the apparatus is a distributed system in that the compensated acquisition module includes computational elements located in a facility separate from the facility or apparatus that hosts the multi-section matched filter.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The present invention will now be described in connection with a receiver for receiving a direct sequence (DS) spread spectrum signal transmitted by a satellite vehicle. A global positioning system (GPS) signal transmitted by a satellite vehicle is an example of a DS spread spectrum signal. It should be understood however, that the present invention, a system for acquiring a spread spectrum signal, is not limited to acquiring a spread spectrum signal in any particular context, such as GPS, nor is it limited to acquiring a particular kind of spread spectrum signal. As will be clear from what follows, the system for acquiring a spread spectrum signal can be of use in any application in which a spread spectrum signal is to be acquired, as long as the spread spectrum signal includes a code component and a carrier component.

Figure 1:
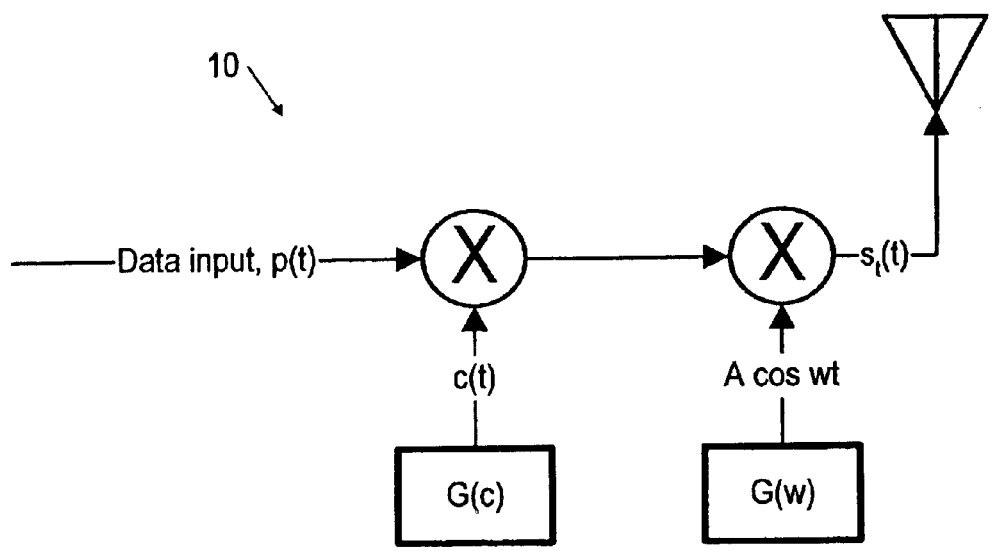
FIG. 1 is a schematic block diagram of a transmitter of a direct sequence (DS) spread spectrum signal.

Referring now to FIG. 1, a transmitter 10 for a DS spread spectrum signal $s_t(t)$ is shown, in which the signal $s_t(t)$ has a data component p(t), a carrier component A cos wt, and also a code component c(t), and is given by, $$s_t(t) = A\ c(t)\ p(t)\cos(wt)$$

where c(t), the code component, is the spreading modulation waveform, and in particular a pseudorandom noise binary sequence (i.e. a code) having values of +/−1; and p(t) is the data component, a binary switching function with possible states of +/−1 governed by the modulating input signal.

Figure 2:
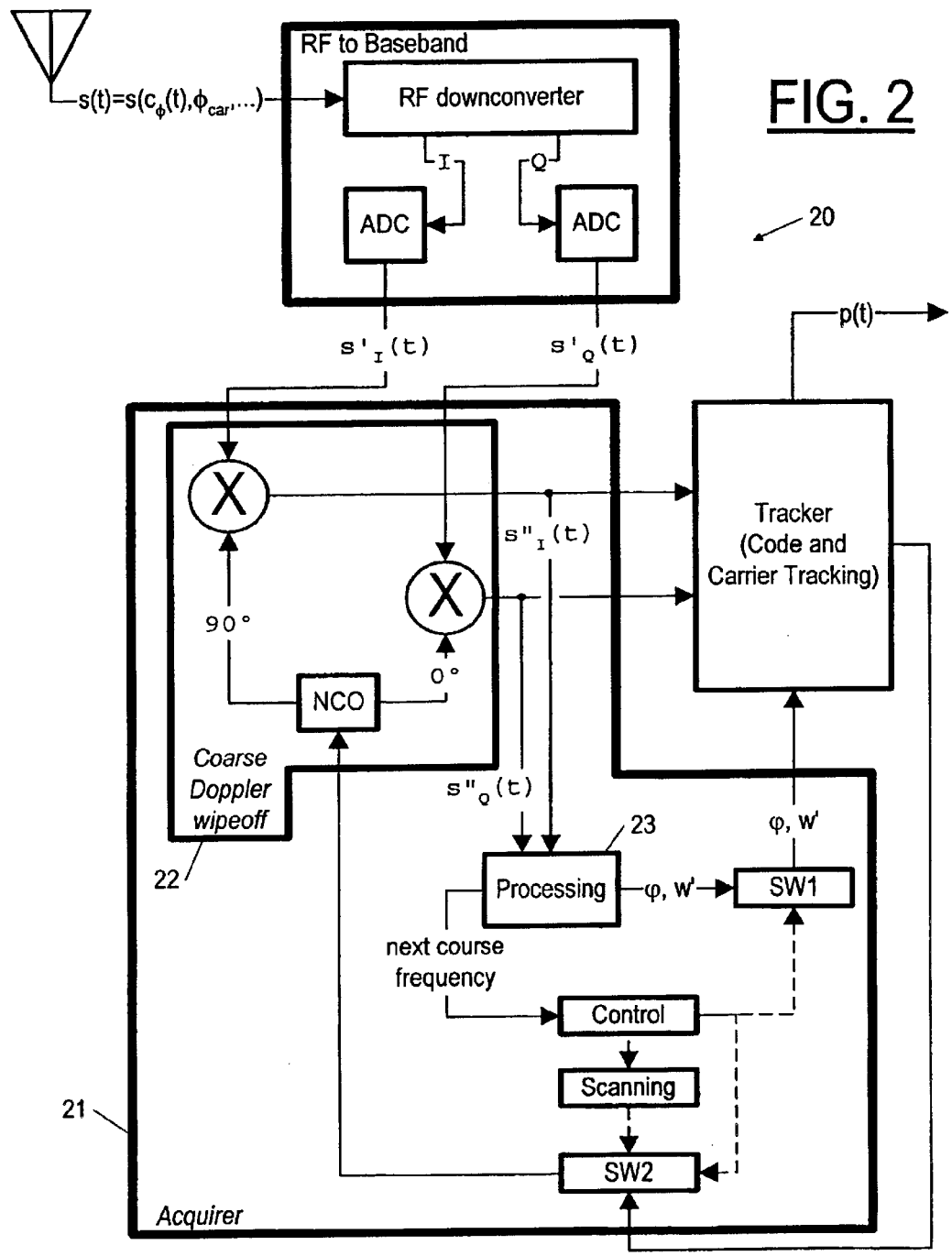
FIG. 2 is a schematic block diagram of an embodiment of a receiver if a direct sequence (DS) spread spectrum signal, an embodiment including an acquirer, which in turn includes a processing module.

Referring now to FIG. 2, a receiver 20 is shown receiving a signal s(t) corresponding to the transmitted signal $s_t(t)$. The receiver 20 includes an acquirer 21 for first acquiring the signal, and a tracker (not the subject of the invention) for making adjustments necessary to track the acquired signal, i.e. to maintain acquisition. The received signal s(t) includes a code component $c_\phi(t)$ at a phase $\phi$ relative to the phase of the code component of the transmitted signal, a carrier component Axcos (w' t+$\phi_{car}$), the $\phi$car indicating that the carrier component of the received signal is out of phase by an amount $\phi_{car}$ with respect to the transmitted signal, and a data component p(t), again in general differing in phase from the data component of the transmitted signal although not expressly indicated. Thus, the received signal is s(t)=$Ac_\phi(t)$ p(t)cos(w' t+$\phi_{car}$). The carrier frequency w' is different than the transmitted frequency w (w' is shifted in frequency from the nominal carrier frequency w) because of the relative motion of the transmitter and receiver, i.e. because of Doppler shifting, and also because of inaccuracies in the receiver and transmitter clocks. A replica of the code component $c_\phi(t)$ is generated in the receiver (in either the acquirer or the tracker, depending on the stage of operation) with some phase $\phi$. In routine receiver operation, after the receiver has acquired a signal, in order to extract the data component the receiver mixes the received signal with a sinusoid at a received carrier frequency w', and also mixes the signal with a replica code $c_\phi(t)$ at a replica code phase $\phi$ that puts the replica code in phase with the transmitted code. (The phases are different because of the transmission time from the satellite to the receiver and also because the clocks in the receiver and transmitter are not synchronized.)

The description here will use the terminology Doppler shift to encompass both a true Doppler shift (i.e. a shift in the expected frequency because of relative motion of the transmitter and receiver) as well as differences from the expected carrier frequency because of clock inaccuracies.

The received carrier frequency w' and the correct replica code phase $\phi$ are determined by an acquirer 21. To acquire the signal s(t), and so to determine the received carrier frequency W' and replica code phase $\phi$, the receiver provides a portion of the received signal s(t) to a radio-frequency (RF) to baseband module that includes an RF downconverter and an analog-to-digital converter (ADC), providing an approximately baseband signal s' (t), which still includes the code component c(t). The RF to baseband module provides in-phase and quadrature versions of the received, downconverted signal, and provides the two versions to respective ADC modules. One ADC module then provides an in-phase digitized, downconverted received signal $s'_I(t)$, and the other provides a quadrature digitized, downconverted signal $s'_Q(t)$. The combination of two such outputs is sometimes treated as a complex entity in what follows.

Instead of an RF to baseband down-converting followed by an analog to digital conversion, it is also possible to use an RF to intermediate frequency conversion followed by a conversion to baseband combined with ADC.

Once the acquirer 21 precisely determines the carrier frequency w', including any Doppler shift δ away from the nominal carrier frequency w, and also the replica code phase φ, the receiver 20 can accurately extract the data signal p(t) from the received signal s(t) by for example first mixing the received signal s(t) with a sinusoid at the precisely determined carrier frequency w', then mixing the resulting signal with a synchronized (in phase) replica code signal $c_\phi(t)$, and finally performing an integrate and dump, leaving only the data signal p(t). Sometimes the data extraction is performed within the tracker, as is indicated in the embodiment shown in FIG. 2. The tracker then not only extracts the data signal p(t) but also examines it to determine whether to make slight, tracking adjustments to the carrier frequency w' or the replica code phase φ so as to keep the receiver 20 tuned to the signal s(t).

Still referring to FIG. 2, the signal s' (t), referring to both $s'_I(t)$ and $s'_Q(t)$, includes both a code component c(t) as well as a residual carrier component depending on the Doppler shift δw. As explained above, the Doppler shift δw in some applications is typically anywhere in a bandwidth of 12 kHz about the nominal carrier frequency w. The code c(t) is typically a pseudorandom sequence of bits of a predetermined length. In case of civil GPS applications, a code-length of 1023 bits is used. Since the code does not itself convey information and is instead merely a device by which the bandwidth of an information-bearing signal is spread over a much wider bandwidth in a way that allows other information-bearing signals to also be spread over and use the same bandwidth, a bit of such a code is referred to as a chip, instead of a bit. The chip rate is typically much greater than the bit rate of the information-bearing signal p(t). In GPS applications, the chip rate is typically 1023 chips per millisecond, whereas the data p(t) is nominally 50 bits per second.

Still referring to FIG. 2, the acquirer 21 is shown as including a coarse Doppler wipeoff module (CDWM) 22 including a numerically controlled oscillator (NCO), a processing module 23, a control module, a scanning module, and switching modules used to switch from acquiring to tracking after a signal is satisfactorily acquired. The control module operates the (with respect to both carrier frequency and code phase), the acquisition module is switched out of the circuit including the NCO, and the tracker is switched into that circuit.

The approximate baseband signal s' (t) is provided to the CDWM 22, which mixes s' (t) with a complex sinusoid (i.e. an in-phase and quadrature sinusoid are mixed with the in-phase and quadrature approximate baseband signals $s'_I$ t) and $s'_Q(t)$), at one of a number of several distinct frequencies in a first set of frequencies spanning a range of frequencies encompassing all possible Doppler shifts. In the preferred embodiment, the first set of frequencies is a set of coarse frequencies. For example, in the case of a GPS receiver, the CDWM 22 would first mix the input s' (t) with a signal at 6 kHz below the nominal carrier frequency, to provide s" (t). Later, at the command of the analysis module 23d, the CDWM 22 would mix the same signal s' (t) at a next coarse frequency, 5 kHz below the nominal carrier frequency, and so on, each time producing a different signal (complex) s" (t) including a different coarse frequency component. It is important to understand that the mixing of to s' (t) with a signal below the nominal carrier frequency, which would be a "negative" frequency, is possible because the mixing is with a complex signal, i.e. two signals in quadrature, and a reference to "above" or "below" the nominal carrier frequency is really a reference to the relative phase of the two quadrature components.

Figure 3:
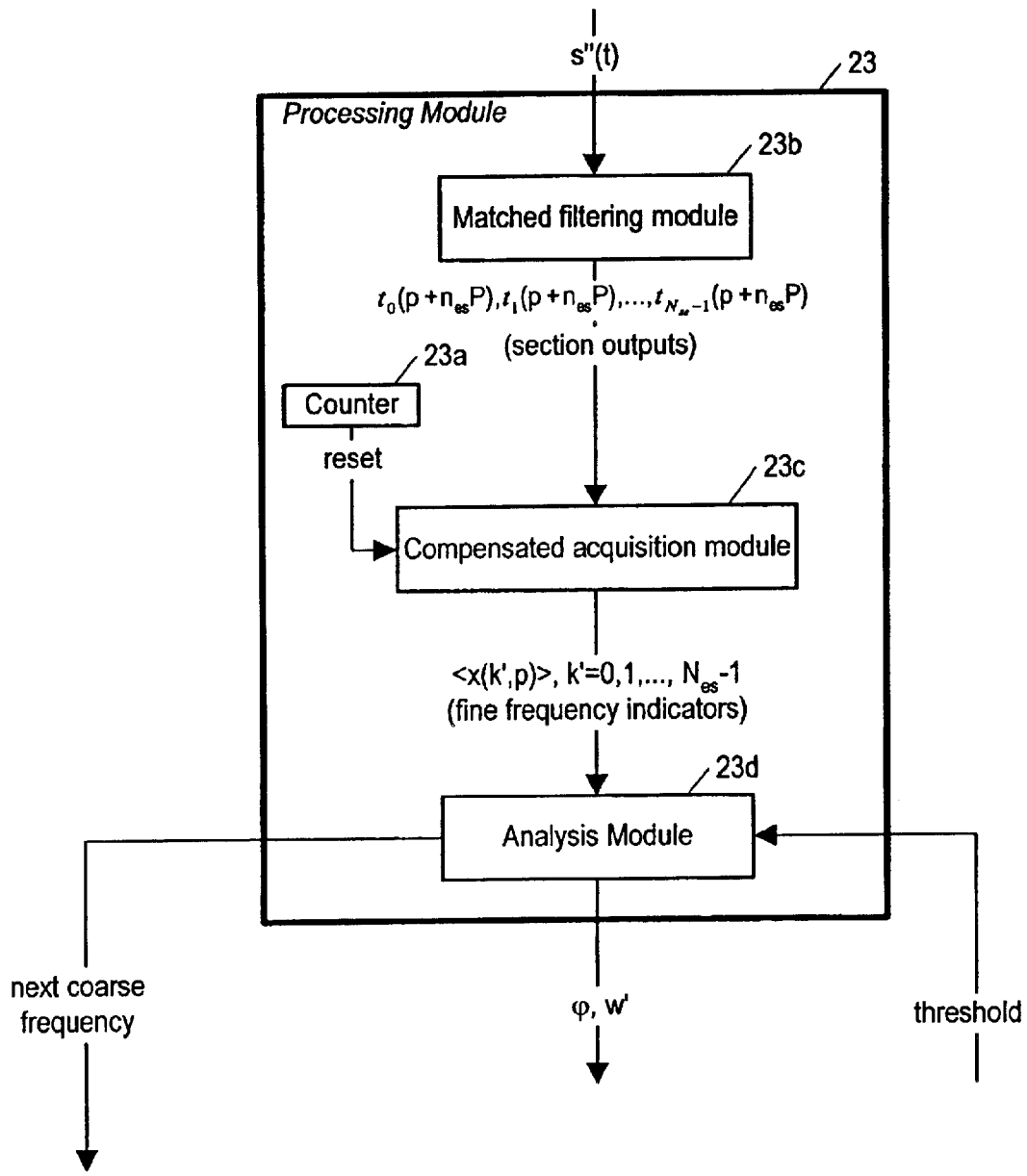
FIG. 3 is a schematic block diagram of the processing module of FIG. 2, including a matched filter and a Compensated Acquisition module.

Referring now to FIG. 3, the output s" (t) of the CDWM 22 is provided to the processing module 23, and in particular to a matched filtering module 23b. The CDWM 22 and the processing module 23 work iteratively to arrive at precise determinations for the code phase and Doppler, the processing module 23 directing the CDWM, as described above, to provide a mixed signal s" (t) at first one coarse frequency and then another, in the coarse set of frequencies spanning the possible Doppler range, each signal s" (t) also corresponding to a particular code phase. The processing module examines each mixed signal s" (t) over one or more code periods (each period being typically 1023 chips in a GPS application) to determine the phase to use for the replica code to synchronize with the received code, and to determine the Doppler-corrected carrier frequency. In examining the signal s" (t), the matched filtering module 23b uses a multi-section matched filter and provides a sequence of outputs $t_0, t_1, \ldots, t_{Nse-1}$, one for each of the Nse sections of the multi-section matched filter, the outputs being provided at times corresponding to a quantity $p+n_{es}P$, where P is the number of possible code phases (1023 in case of sampling at the rate of MS one sample per chip in a GPS application). The variable p assumes successively the values $0,1,\ldots,P-1,0,1,\ldots$ and so on, (i.e. it increases to P−1 and then cycles back to zero to start again) and the variable $n_{es}$ increments by one each time p cycles back to zero, and ranges from 0 to the value of the constant $N_{es}$, which is the number of code periods (i.e. e.g. periods of 1023 chips) in a processing cycle. The number of sections of the matched filter can be a quite small number; in fact using $N_{se}=2$ sections provides good results.

Still referring to FIG. 3, the processing module 23 includes a compensated acquisition module (CAM) 23c, which in performing a cycle of processing receives outputs from the matched filtering module 23b and produces, at successive times, a sequence of outputs <x(k',p)>, for $k'=0,1,\ldots,N_{es}-1$, and $p=0,1,\ldots,P-1$, each output corresponding, through k', in the preferred embodiment, to a particular fine frequency offset from the coarse frequency used by the CDWM (k' being used here because k is used later to indicate the sought after fine frequency offset), and also through p to a particular replica code phase. A code period could be for example 1023 chips, and in the preferred embodiment the number of code periods for coherent combining (described below) is equal to the number of .fine frequencies used to more precisely determine the Doppler correction. It is also possible for the number of code periods used for coherent combining to differ from the number of fine frequencies. Further, the index k', which indicates a particular fine frequency offset from the coarse frequency in the preferred embodiment, in general indicates a frequency in a second set of frequencies that are not necessarily fine frequencies.

Still referring to FIG. 3, the processing module 22 also includes an analysis module 23d, which examines the outputs <x(k',p)>, for $k'=0,1,\ldots,N_{es}-1$ and $p=0,1,\ldots,P-1$ to determine which is the largest output. It then determines whether the largest output is larger than a pre-determined threshold, and if so, uses the corresponding replica code phase φto synchronize to the received code c(t), and uses the offset corresponding to $n_{es}$ in conjunction with the coarse frequency provided by the CDWM 22 to determine the Doppler shift δw.

Instead of deciding whether the signal has been acquired based on finding the maximum element of a single matrix spanned by code phase and fine frequency offsets, the decision could be based on analyzing several of such matrices. In such an embodiment, the system would conclude that the signal had been acquired if the same element in successive such matrices exceeded a pre-determined threshold for a pre-determined fraction of the successive matrices, e.g. in L matrices out of M successive matrices.

With respect to the offset of the fine frequency offset, the variable k' of the CAM output <x(k',p)>can be thought of as a frequency bin number, corresponding to a particular fine frequency offset. For example, if 10 frequency bins are used along with a coarse frequency of interval 1 kHz, the first bin could correspond to an offset of 100 kHz from the coarse frequency used by the CDWM 22, and so on, or could correspond to the first fine frequency in a set of fine frequencies centered on the coarse frequency. In the latter, preferred implementation, the first fine frequency would be some offset below the coarse frequency, and the last fine frequency would be some offset above the coarse frequency. Using the first implementation for illustration, however, if the analysis module 23d determines that x(3,p) is the maximum output of the sequence being examined, and that it is larger than the pre-determined threshold, and if the CDWM has mixed the signal s' (t) with a sinusoid at 4 kHz, then the analysis module would determine that the correct replica code phase p would be that corresponding to p, and the corrected carrier frequency would be w'=w+4 kHz+300 Hz, where w is the non-shifted carrier frequency. The outputs x(k',p) are complex (quadrature) quantities, and a particular x(k',p) is determined by the analysis module 23d to be "maximum" in the sense that its magnitude is maximum.

Figure 4:
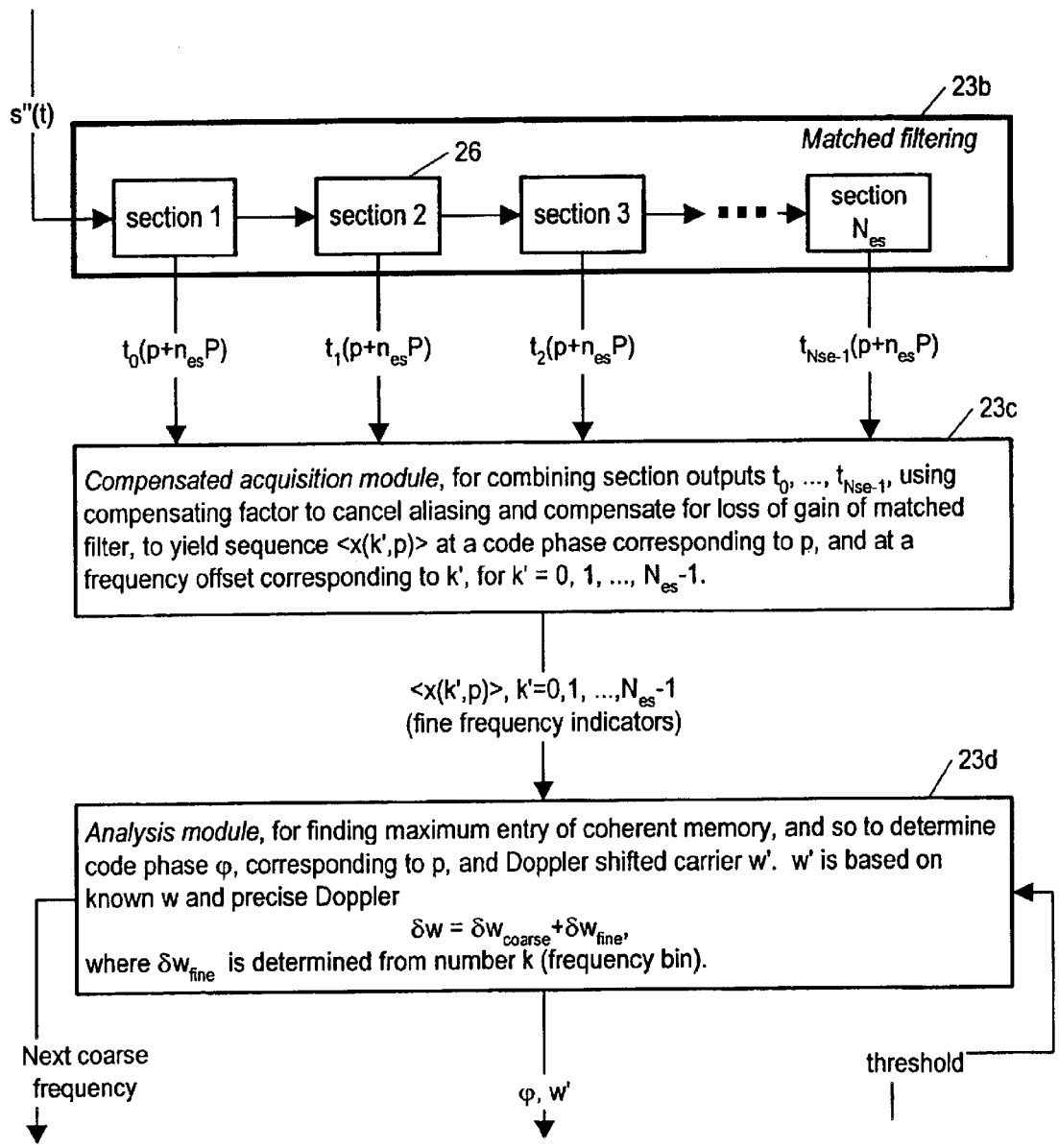
FIG. 4 is a more detailed schematic block diagram showing some of the components of the processing module of FIG. 3, including a more detailed block diagram of the matched filter.

Referring now to FIG. 4, the mixed signal s" (t) is then provided bit by bit to the matched filtering module 23b which is implemented as a multi-section matched filter, consisting of a number of sections 26, each of which performs a correlation of the mixed signal s" (t) with a replica code. Since the mixed signal s" (t) is provided bit by bit, it is compared with the replica code at different relative phases.

Figure 5:
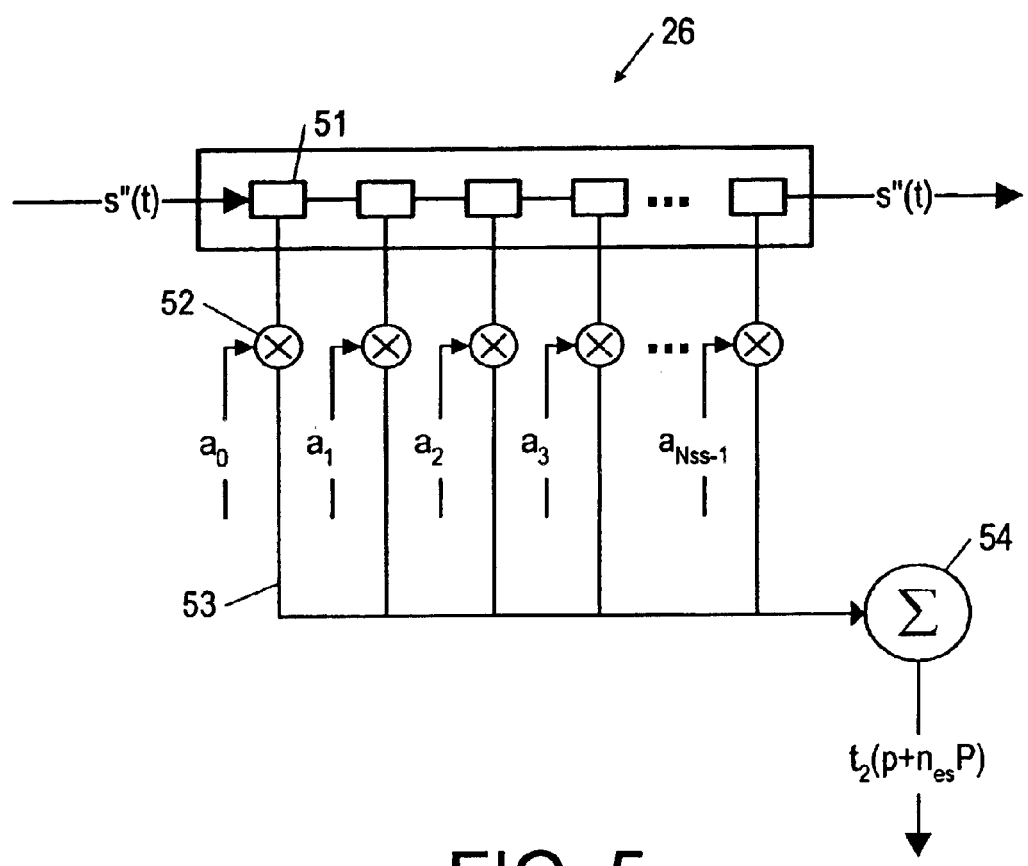
FIG. 5 is a more detailed schematic block diagram of one section of the matched filter of FIG. 4.

Referring to FIG. 5, a section 26 of the multi-section matched filter is shown as a tapped delay line, including $N_{ss}$ different taps 51 in each section in an embodiment where the number of taps is taken to be the same for each section (although $N_{ss}$ could in general be different for different sections), with the tapped values weighted by the PRN sequence that defines the replica code $c_{100}$ (t) (and also defines c(t), the transmitted code) using multipliers 52, to provide weighted taps 53. Adder 54 sums the weighted taps, at a time corresponding to the quantity $p+n_{es}P$, to provide a section output $t_s(p+n_{es}P)$.

The motivation for using a multi-section matched filter, as opposed to a single-section matched filter, is that doing so allows canceling aliasing associated with matched filtering, and also allows compensating for loss of gain of the matched filter at the edges of the coarse frequency interval, i.e. at or near +/−500 Hz about the coarse frequency used by the CDWM 22. The matched filtering is equivalent to filtering and downsampling when the replica code is aligned with the received code, and is a non-ideal low pass filtering, therefore leading to the received sinusoid displaying itself at a wrong frequency, i.e. aliasing. This aliasing leads to error in the frequency detection by the acquisition system. By dividing the matched filter into sections, it is possible to apply a compensating factor, as will be described below, to each section output $t_s(p+n_{es}P)$ to cancel the aliasing, as well as to compensate for the loss of gain of the matched filter at the limits of its bandwidth.

Referring again to FIG. 4, the section outputs $t_s$ p+$n_{es}$P) are provided to the CAM 23c. Using a compensating factor as described below, the CAM combines the section outputs for each k' (corresponding to a fine frequency offset from the coarse frequency used by the CDAM 22) and stage p+$n_{es}$P of the matched filter, to determine a value <x(k,p)>for each pair (k,p) corresponding to a frequency and a replica code phase, respectively. At the beginning of each new cycle of processing corresponding to a new coarse frequency, each initial value is reset to zero when the counter 23a (FIG. 3) sends a reset signal at the end of the previous cycle. Finally, the analysis module 23d examines the <x(k,p)>for different k and p, to determine whether any value indicates a particular replica code phase and Doppler correction, as explained above, by comparing the maximum value found with a predetermined threshold.

Coherent Combining and Use of Compensating Factor

What will now be explained is the use of the compensating factor to cancel aliasing and correct for loss of gain of the matched filter (at the edges of the coarse frequency interval). In this explanation, noise is ignored, and the effect of the relatively slowly varying data signal p(t) (50 Hz BPSK signal for GPS) is also ignored, i.e. data modulation effects are not taken into account.

Analytically, the object is to compensate for the Doppler effect and clock inaccuracies causing a modulation of the signal that can be expressed as, $$X_{r=xt}e^{j\delta w \cdot n+\theta},$$

where $x_r$ and $x_t$ are the received and original signal from a satellite, and n and δw denote time and the Doppler shift (i.e. as explained above, any frequency shift or difference in frequency of the received frequency compared to the nominal transmitted frequency) respectively. When the received signal is aligned with the local code replica, i.e. it is in phase, then after multiplying with the local code replica, the weighted taps (within a section) of the matched filter provide, $$x_{n_{ss}n_{se}n_{es}} = e^{2\pi jk \frac{n_{ss}+n_{se}N_{ss}+n_{es}N_{ss}N_{se}}{N_{ss}N_{se}N_{es}}}, \quad (1)$$

an equation that holds true only when the received signal is aligned with the replica code, where k corresponds to a fine frequency offset that represents the actual Doppler shift. (It is the object of the acquirer 21 to determine k.) In equation (1), as indicated above, the constant $N_{ss}$ is the number of samples in one section of the matched filter; the constant $N_{se}$ is the number of sections of the matched filter; the constant $N_{es}$ is the number of code periods for coherent combining (described below); and the corresponding lower case symbols, $n_{ss}$, $n_{se}$ and $n_{es}$ are indices ranging from zero to one less than the values of the constants to which they correspond. Thus, e.g. $n_{es}$ is an index ranging from 0,1, . . . ,$N_{es}$−1. The quantity $n_{ss}+n_{se}N_{ss}+n_{es}N_{ss} N_{se}$ in equation (1) acts as a time parameter for the period $N_{ss}N_{se}N_{es}$, and frequency is considered for a grid $$\delta w = \frac{2\pi k}{N_{ss}N_{se}N_{es}}.$$

A correlation computed by each section of the matched filter adds portions of signals, yielding $t_{n_{se}}(p+n_{es}P)$. These section outputs can be written in terms of a new quantity $x_{n_{se}n_{es}}$ as follows:

$$t_{n_{se}}(p+n_{es}P) = x_{n_{se}n_{es}}(p). \quad (2)$$

Then, when the received signal is aligned with the replica code, the taps of the matched filter section $n_{se}$ sum according to, $$x_{n_{se}n_{es}} = \sum_{n_{ss}=0}^{N_{ss}-1} e^{2\pi jk \frac{n_{ss}+n_{se}N_{ss}+n_{es}N_{ss}N_{se}}{N_{ss}N_{se}N_{es}}} \quad (3)$$

$$= e^{2\pi jk \frac{n_{se}+n_{es}N_{se}}{N_{se}N_{es}}} \sum_{n_{ss}=0}^{N_{ss}-1} e^{2\pi jk \frac{n_{ss}}{N_{ss}N_{se}N_{es}}}$$

$$= e^{2\pi jk \frac{n_{se}+n_{es}N_{se}}{N_{se}N_{es}}} F_{ss}(k)$$

using $$F_{ss}(k) = \sum_{n_{ss}=0}^{N_{ss}-1} e^{2\pi jk \frac{n_{ss}}{N_{ss}N_{se}N_{es}}} = e^{\pi jk \frac{N_{ss}-1}{N_{ss}N_{se}N_{es}}} \frac{\sin\left(\frac{\pi k}{N_{se}N_{es}}\right)}{\sin\left(\frac{\pi k}{N_{ss}N_{se}N_{es}}\right)}, \quad (4)$$

where $N_{ss}$ is the length of a matched filter section (e.g. 512 chips), and the subscript ss of $F_{ss}$ indicates that $F_{ss}$ pertains to a particular section of the matched filter.

According to the prior art, to determine a code phase and Doppler correction, a coherent combining of the $x_{n_{se}n_{es}}$ is performed over both the outputs of each matched filter section and over a pre-determined number of code periods (but without using a compensating factor as described below), according to $$x(k, p) = \sum_{n_{es}=0}^{N_{es}-1} \sum_{n_{se}=0}^{N_{se}-1} x_{n_{se}n_{es}}. \quad (5)$$

As explained above, the term coherent combining is used here to indicate any summation in which the sign or phase of the summand is taken into account. (An example of non-coherent combining is given by equation (7) below.)

The sum given by equation (5) includes the effect of aliasing and loss of gain, i.e. it does not correct for aliasing nor loss of gain. The present invention computes the summation of equation (5) using a compensating factor to compensate for aliasing and degradation. The precise details of how a system computes the compensated sum determine whether the system is a full-calculating system or a fast-calculating (shortcut) system, both of which are provided by the present invention. The shortcut system is an approximation to the compensated sum 10 computed in the full-calculating system, which will be explained first. Both systems conform to the representations of FIGS. 3–8.

Full-calculating System

Figure 6:
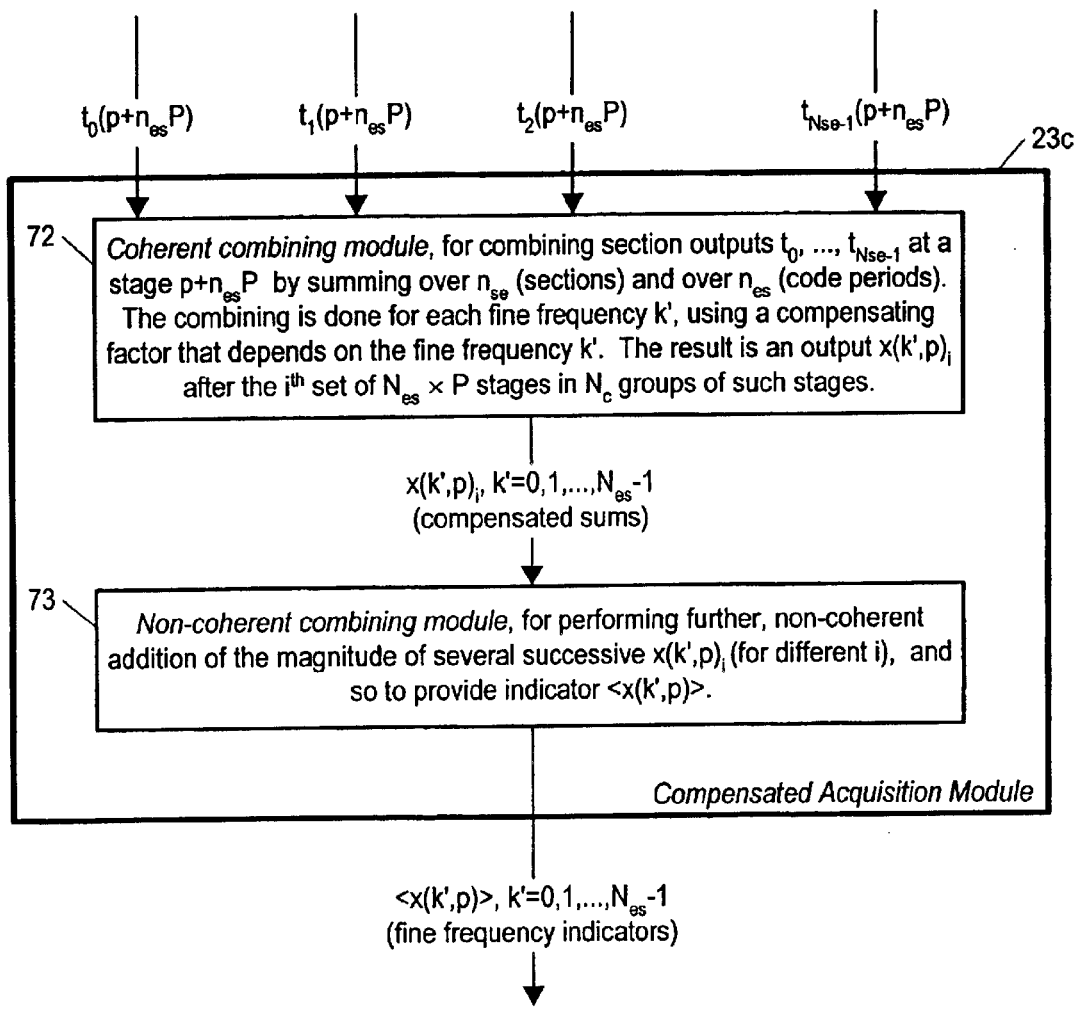
FIG. 6 is a more detailed schematic block diagram of the Compensated Acquisition module of FIGS. 3 and 4, indicating the use of a compensating factor to cancel aliasing.

Referring now to FIG. 6, the CAM 23c is shown as including a coherent combining module 72 and a non-coherent combining module 73, which is optional. It is the coherent combining module 72 that computes the compensated sum, as follows.

To compensate for the degradation and aliasing, the present invention performs the same summation as equation (5) but uses a compensating factor, $$e^{-2\pi jk' \frac{n_{se}+n_{es}N_{se}}{N_{se}N_{es}}}$$

so that in the present invention, in the full-calculation embodiment, the output of the coherent combining module 72 is given by, $$x(k', p)_i = \sum_{n_{es}=0}^{N_{es}-1} \sum_{n_{es}=0}^{N_{se}-1} e^{-2\pi jk' \frac{n_{se}+n_{es}N_{se}}{N_{se}N_{es}}} x_{n_{se}n_{es}} \quad (6)$$

where the i indicates the $i^{th}$ set of $N_{es} \times P$ stages in a group of $N_c$ such stages, as is explained in connection with FIGS. 8A–B, below. Such a compensated coherent combining of the outputs of the multi-section matched filter produces a coherently combined result $x(k',p)_i$, the collection of such elements for p=0, . . . ,P–1 each being called a compensated sum. In the preferred embodiment, the coherent combining involves a summation not simply over the number of sections $N_{se}$ of the matched filter, but also over more than one code period, i.e. for $N_{es}>1$. Note that when k' in equation 6) is equal to k (the unknown, sought after fine frequency offset) in equation (3), the compensating factor in equation 6), namely $$e^{-2\pi jk' \frac{n_{se}+n_{es}N_{se}}{N_{se}N_{es}}}$$

cancels the sinusoidal factor in equation (3), namely $$e^{2\pi jk \frac{n_{se}+n_{es}N_{se}}{N_{se}N_{es}}},$$

and the summation indicated in equation 6) yields (since here the received signal is aligned with the replica code), $$x(k')_i = N_{es}N_{se}F_{ss}(k'),$$

which has a magnitude that is the maximum possible magnitude the summation can yield. Specifically, $$(x(k)_i) = N_{es}N_{se}N_{ss},$$

when the received signal is aligned with the replica code.

Finally, note that the compensating factor in equation (6) becomes simply unity for a single-section matched filter, i.e. for $N_{se}=1$, and in the absence of coherent accumulation over code periods, i.e. for $N_{es}=1$.

Non-coherent Combining

There is still a further, optional, non-coherent combining of the $x(k',p)_i$, a combining for each of $N_c$ different groups of $N_{es} \times P$ stages, as indicated by the index i, where i ranges from 0 to $N_c-1$. The non-coherent combining yields a sequence of values <x (k', p)>, for k'=0,1, . . . , $N_{es}-1$, where $N_{es}$ is the number of fine frequency divisions (and is also the number of code periods for coherent combining). It is the sequence of values <x(k',p)>, for p=0, . . . , P–1 that is examined by the analysis module 23d to determine a code phase and Doppler correction.

Still referring to FIG. 6, the non-coherent combining module 73 takes the magnitude of each $x(k',p)_i$ (it is in general complex), and accumulates it according to:

$$<x(k', p)> = \sum_{i=0}^{N_c-1} \|x(k', p)_i\| \quad (7)$$

where $N_c$ is the number of sets of coherently combined output that are to be combined non-coherently. Thus, the non-coherent combining is a fine frequency-wise combining (i.e. combining all elements with the same fine frequency) of each element in $N_c$ groups of successive compensated sums. If $N_c=1$, then there is no actual non-coherent combining, but there is still the taking of a magnitude of each element in the one group of compensated sums, and the terminology non-coherent combining is intended to encompass the case of $N_c=1$. Non-coherent combining amplifies any phase difference between the code of the receiver signal and the replica code, and also amplifies the effect of the Doppler shift. However, it is possible and in some applications advantageous to practice the present invention without non-coherent combining, for example where acquisition time is more important than precision.

The CAM as implemented as shown in FIG. 6 can perform either the full-calculating system being discussed here, as well as the fast-calculating system, which is discussed below, because the difference between the full and fast-calculating system is only in the details of how the coherent-combining module 72 performs its computation, as discussed below.

Figure 7:
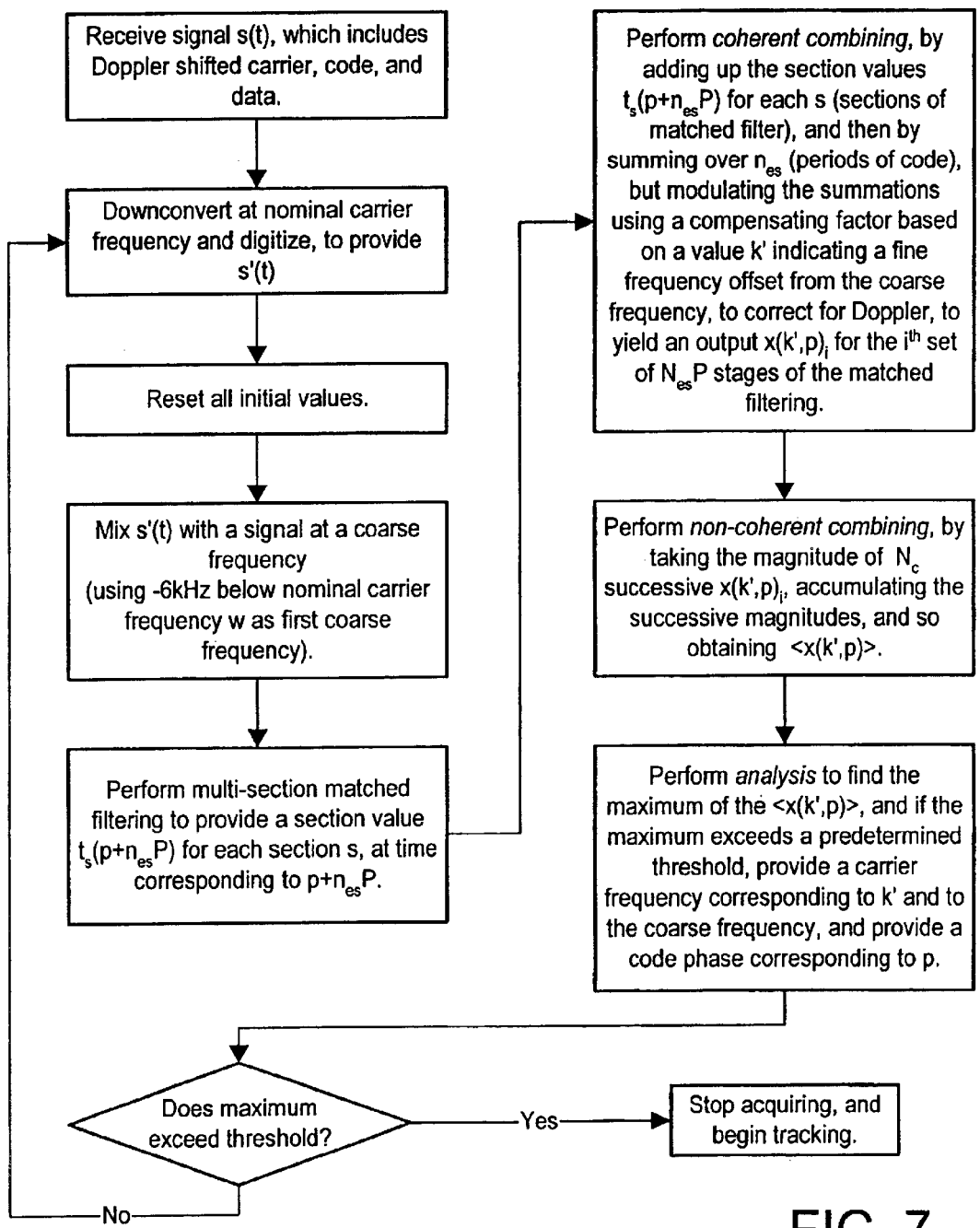
FIG. 7 is a flowchart of the acquisition method corresponding to the embodiment of FIG. 6.

Referring now to FIG. 7, a flowchart of the method of the present invention for providing for aliasing canceling is shown. The flowchart of FIG. 7 applies also to the fast-calculating system, for the same reasons as FIG. 6 applies to both the full and fast-calculating system.

Strategy for Reducing Complexity

The full-calculating embodiment, culminating in equation (6), increases the complexity of the spectral analysis part of the search. The increase in complexity is due to the contribution of each matched filter section output to every frequency bin (a memory location corresponding to a particular fine frequency, used for tallying the corresponding fine frequency indicator). The acquisition can be made faster by subdividing the frequency bins into groups and then using a common compensation for each group. Depending on the number of frequency bin groups, the number of bins within each group, and also on the number of matched filter sections (a number as small as two can providing provide good enough alias canceling for many applications), different levels of aliasing cancellation can be achieved.

Flow of Processing

Figure 8A:
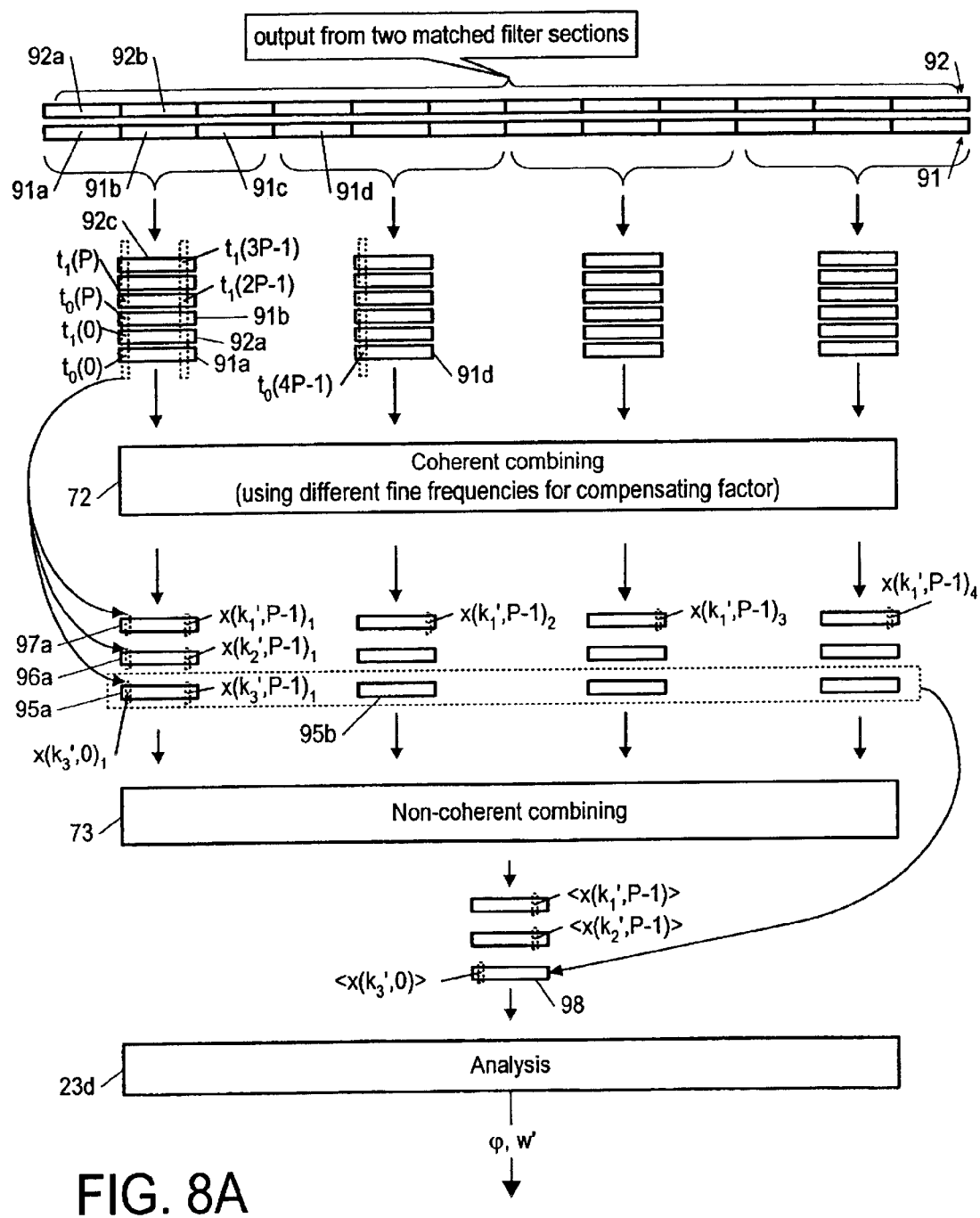
FIG. 8A is an illustration of an embodiment for processing the outputs from a two-section matched filter as used in an acquirer performing either a full or a fast calculation with coherent combining.
Figure 8B:
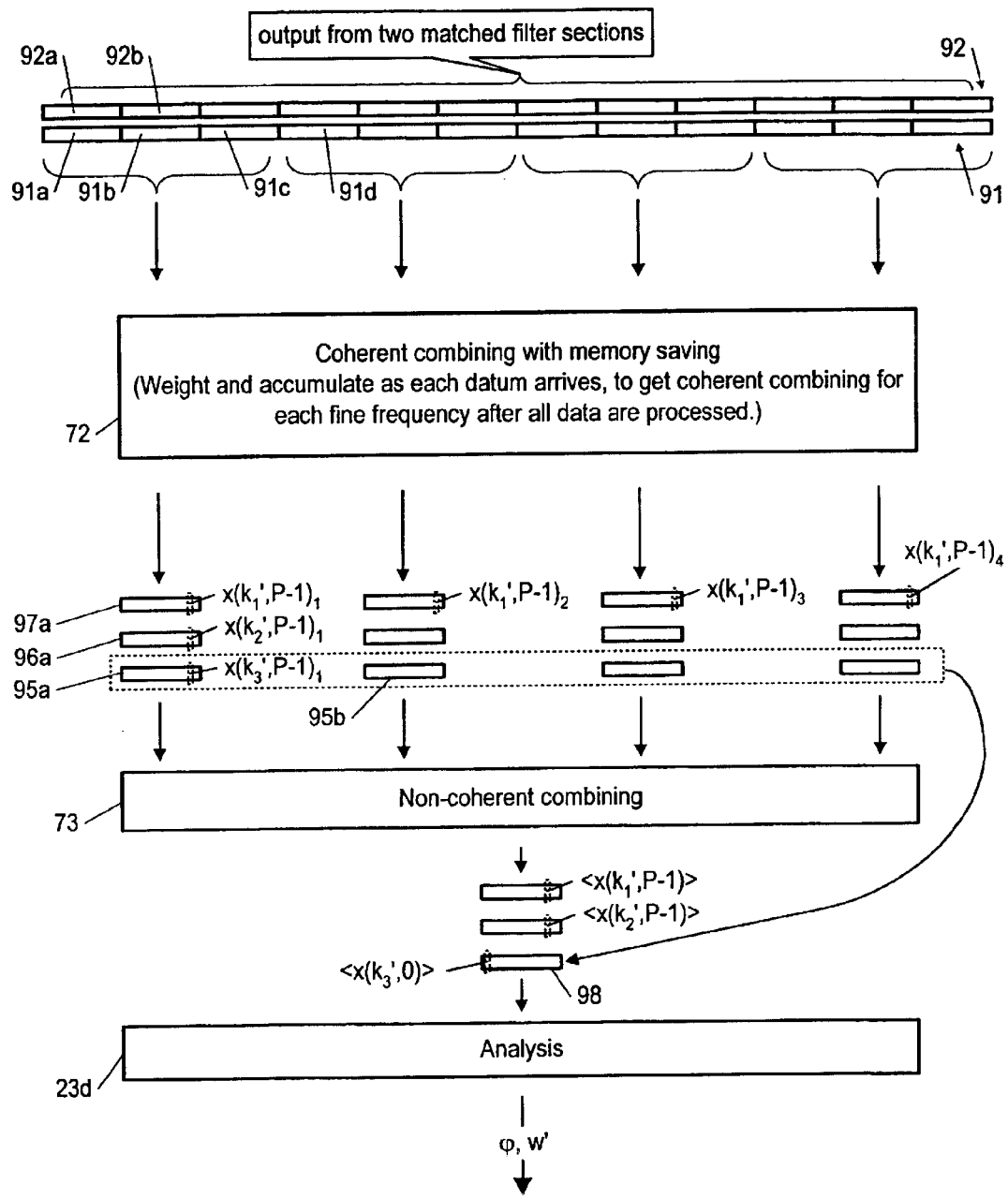
FIG. 8B is an illustration of another embodiment for processing the outputs from a two-section matched filter as used in an acquirer performing either a full or a fast calculation, but using less memory than the embodiment of FIG. 8A.

Referring now to FIGS. 8A–B, the overall flow of processing is shown first (in FIG. 8A) for an acquirer using a two-section matched filter, and next (FIG. 8B) for an acquirer using a two-section matched filter but having an alternative flow of processing, one that requires less memory than the flow of processing according to FIG. 8A. It is important to understand that although each of FIGS. 8A and 8B shows a module performing coherent combining, neither indicates the precise details of the coherent combining, i.e. neither indicates coherent combining according to equation 6) (used by the full-calculating system) or equation (11) (used by the fast-calculating system) and described.

Referring now in particular to FIG. 8A, the flow of processing according to the present invention in case of a two-section matched filter is shown. One section of the matched filter provides a sequence of 12 successive section outputs 91a, 91b, ..., and so on, each section output being one code period long (for example 1023 chips), making up one row 91 of section outputs, and the other section of the matched filter provides a sequence of 12 successive section outputs 92a, 92b, ..., and so on, also each one code period long, making up one row 92 of outputs. The successive section outputs from each section are combined in groups of three by the module 72 (see also FIG. 6) for coherent combining. They are shown being processed by the module 72 for coherent combining in the order of their arrival: the first output 91a from the first section arrives, then the first output 92a from the second section, and so on.

The section outputs 91a, 91b, ..., of the first section of the matched filter are $t_0(p+n_{es}P)$ (see for example FIG. 5), each corresponding to a different p and $n_{es}$, and the outputs 92a, 92b, ..., of the second section are $t_1(p+n_{es}P)$, each also corresponding to a different p and nes. Thus, the first element of the first output 91a of the first section of matched filter is $t_0(0)$ and the last element of that output 91a is $t_0(P-1)$ (and arrives at the coherent combining module later in time than the first element). Thus also, the first element of the first output 92a of the second section of matched filter is $t_1(0)$ and the last element of that output 92a is $t_1(P-1)$. Each element of the output of each section corresponds to a different phase between the code of the received signal and the replica code.

The outputs 95a (and so on) of the module 72 for coherent combining, called the compensated sums, are a code-phase element-wise coherent combining of each of the inputs 91a–92c, using a different compensating factor for each fine frequency. In FIGS. 8A–B, three fine frequencies k1', k2', and k3' are used, although typically up to a thousand fine frequencies are used, each corresponding to a 1 Hz further offset from the coarse as frequency being used by the CDWM 22 (FIG. 2). Thus, FIG. 8A shows three compensated sums 95a, 96a, 97a, each corresponding to a different fine frequency $k_1'$, $k_2'$, and $k_3'$ respectively.

FIG. 8A also shows the optional non-coherent processing of four sets ($N_c=4$) of compensated sums. The non-coherent combining module 73 combines, fine frequency-wise, the magnitudes of the compensated sums of each of the four sets, providing what is called for each fine frequency, a fine frequency indicator. Thus, for example, all of the compensated sums 95a–d at fine frequency k3' are combined to yield the fine frequency indicator 98 with elements <x(k3',p)>, for p=0, ..., P-1. The non-coherent combining shown in FIG. 8A is performed according to equation (7), using in this case $N_c=4$. For $N_c=1$, i.e. no non-coherent combining, there is still an operation of taking the magnitude of the compensated outputs, i.e. equation (7) is still used, and provides simply:

$$<x(k',p)> = \|x(k',p)_0\|, \text{ for } p=0, \ldots, P-1 \quad (8)$$

as the elements of the fine frequency indicator for fine frequency k'.

FIG. 8A shows lastly the analysis module 23d determining the code phase φ and Doppler correction w', as explained above.

The coherent combining shown in FIG. 8A uses a non-memory savings processing flow in which the outputs 91 92 of the matched filter sections are first collected, then combined coherently. There is no separate accumulating of data for non-coherent processing as well. As one block of data is coherently processed, its magnitude (absolute value) is added to the content of non-coherent memory.

In FIG. 8B, the flow is shown of the outputs of a two-section matched filter in a memory-saving implementation for the coherent processing. Here the outputs 91 92 are not all collected before being coherently combined, but instead, as each arrives, it is weighted and accumulated. This memory-saving implementation is possible because the inner sum in both equations (6) and (11) is controlled by the variable $n_{se}$ and is computed in parallel as data (the matched filter section outputs) become available in parallel. Because the data become available over a period of time, the data can either be saved in memory and then the sum performed as in FIG. 8A, or the sum can be performed as the data arrives, as in FIG. 8B.

The Fast-calculating System.

It is possible to approximate the coherent combining of the full-calculating system to yield a fast-calculating system, albeit a more approximate system. To speed up the acquisition and so provide the fast-calculating system, split the frequency as follows:

$$k' = k_{es1} + k_{es2} N_{es1}, \quad (9)$$

where $k_{es1} = -N_{es11}, \ldots 0, \ldots, N_{es12}$ in which $N_{es11} + N_{es12} + 1 = N_{es1}$, and $k_{es2} = -N_{es21}, \ldots, 0, N_{es22}$ in which $N_{es21} + N_{es22} + 1 = N_{es2}$ where $N_{es1} \cdot N_{es2} = N_{es}$. Splitting k' in this way replaces the task of calculating the coherent combining via equation (6) for each of some pre-determined number of k' with calculating the coherent combining for a smaller number of values of $k_{es1}$ and $k_{es2}$. For example (for illustration only), if k'=0, 1, . . . , 9, so that $N_{es}=10$, then $N_{es1}$ (the number of possible values of $k_{es1}$) can be chosen to be 5, requiring that $N_{es2}$ be 2 (since $N_{es1} \cdot N_{es2} = N_{es}$). then for any value of k' (of which there are then), $k_{es1}$ is an element of the set {0,1,2,3,4} and $k_{es2}$ is an element of the set {0,1}. More specifically, Table 1 below show the values of kes1 and kes2 corresponding to each possible value of k'.

TABLE 1

An illustration of expressing each value of k' in terms of $k_{es1}$ and $k_{es2}$

| k' = K$_{es1}$ + k$_{es2}$N$_{es1}$ | K$_{es1}$ | K$_{es2}$ |
| --- | --- | --- |
| 0 | 0 | 0 |
| 1 | 1 | 0 |
| 2 | 2 | 0 |
| 3 | 3 | 0 |
| 4 | 4 | 0 |
| 5 | 0 | 1 |
| 6 | 1 | 1 |
| 7 | 2 | 1 |
| 8 | 3 | 1 |
| 9 | 4 | 1 |

Thus, as indicated in Table 1, all k' in the range from 0 to 4 correspond to $k_{es2}=0$, and all k' in the range from 5 to 9 correspond to $k_{es2}1$. For each $k_{es2}$, there are several values of $k_{es1}$. It is this grouping of many different k' into a small number of $k_{es2}$ that forms the basis of the fast-calculating system. In the illustration, for each value of $k_{es2}$, there are the same number of values of $k_{es1}$, but it is also possible to have different sized groups, i.e. to have a different number of possible values of $k_{es1}$ for different values of $k_{es2}$.

With the splitting of k', equation (3) can be rewritten as $$x_{n_{se}n_{es}} = e^{2\pi j \frac{(k_{es1}+k_{es2}N_{es1})(n_{se}+n_{es}N_{se})}{N_{se}N_{es}}} \quad (10)$$

$$F_{ss}(k) = e^{2\pi j \frac{k_{es1}n_{se}}{N_{se}N_{es}}} e^{2\pi j \frac{k_{es2}n_{se}}{N_{se}N_{es2}}} e^{2\pi j \frac{(k_{es1}+k_{es2}N_{es1})n_{es}}{N_{es}}} F_{ss}(k),$$

which holds true only when the received signal is aligned with the replica code, just as for equation (3). Ignoring the effect of the first sinusoid, and using $N_{es1} \cdot N_{es2} = N_{es}$, equation (10) becomes, $$x_{n_{se}n_{es}} = e^{2\pi j \frac{k_{es2}n_{se}}{N_{se}N_{es2}}} e^{2\pi j \frac{(k_{es1}+k_{es2}N_{es1})n_{es}}{N_{es}}} F_{ss}(k).$$

Thus, the compensating factor of equation (6) can be similarly approximated so that the coherent combining via equation (6) becomes $$x(k',p)_i = \sum_{n_{es}=0}^{N_{es}-1} \sum_{n_{se}=0}^{N_{se}-1} e^{-2\pi j \frac{k_{es2}n_{se}}{N_{se}N_{es2}}} e^{-2\pi j \frac{(k_{es1}+k_{es2}N_{es1})n_{es}}{N_{es}}} x_{n_{se}n_{es}},$$

which can be rewritten, $$x(k_{es1},k_{es2},p)_i = \sum_{n_{es}=0}^{N_{es}-1} e^{-2\pi j \frac{(k_{es1}+k_{es2}N_{es1})n_{es}}{N_{es}}} \sum_{n_{se}=0}^{N_{se}-1} e^{-2\pi j \frac{k_{es2}n_{se}}{N_{se}N_{es2}}} x_{n_{se}n_{es}}. \quad (11)$$

Equation (11) is the basis for the fast-calculating system. Besides using equation (11) instead of equation (6), the fast-calculating system is identical to the full-calculating system. Equation (11) shows that the calculation of the full-calculating system, according to equation 6), can be re-organized so as to proceed in two stages, a first stage in which a partial compensation by a value of $k_{es2}$ is determined, and a second stage in which a further partial compensation by each value of $k_{es1}$ is determined (for the current value of $k_{es2}$), the calculation proceeding until all values of $k_{es2}$ are applied.

Figure 9:
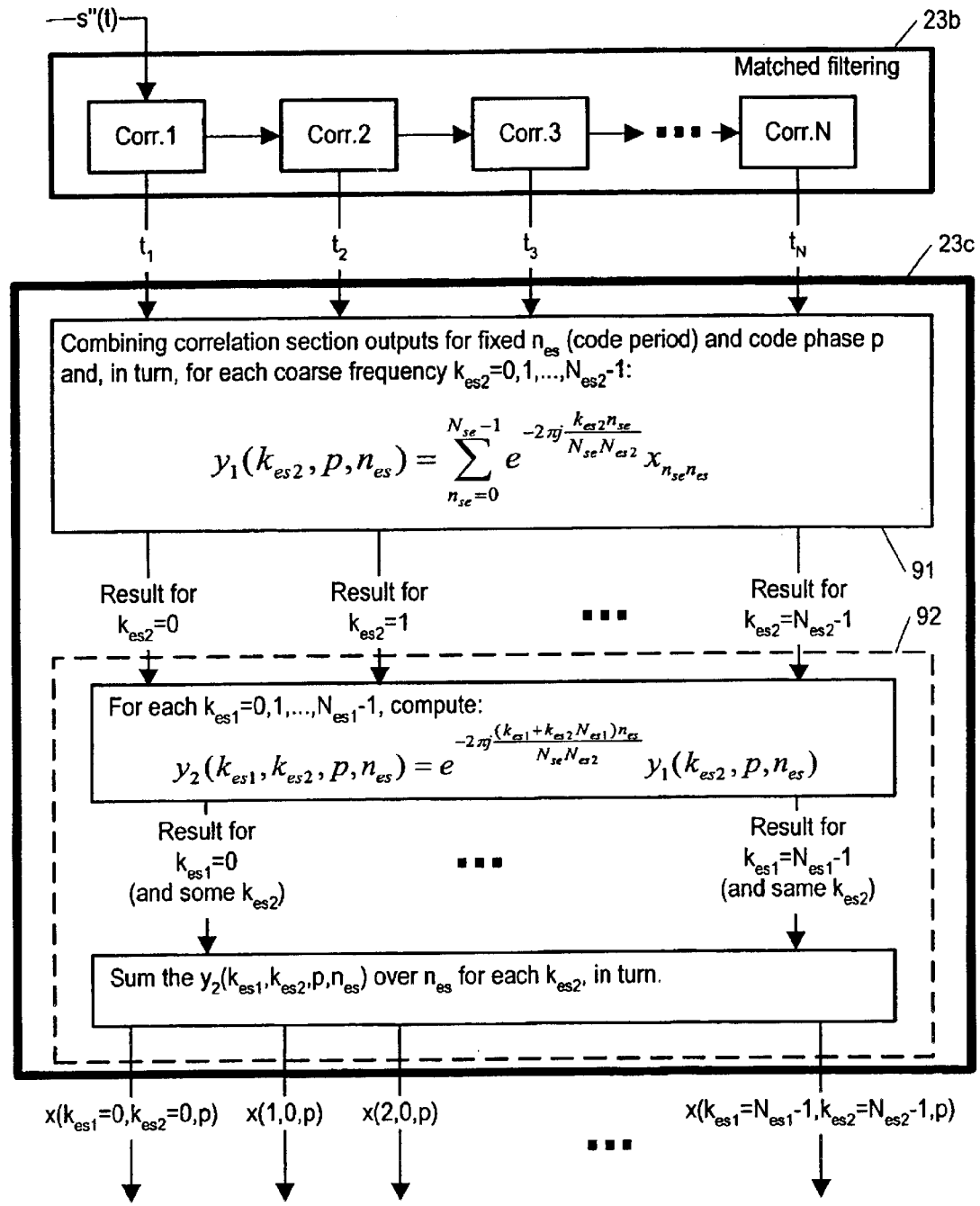
FIG. 9 is a schematic showing compensation for aliasing and loss of gain according to the fast calculation.

Referring now to FIG. 9, the reorganizing of the coherent combining, with compensation, is thus shown as proceeding in two stages in the fast-calculating system. In the first stage 91, there is a first coherent combining with partial compensation, for each frequency $k_{es2}$, in turn, of the outputs of the $N_{se}$ correlation sections. In the second stage 92, for each frequency $k_{es2}$ in turn, there is a second coherent combining with further compensation for each frequency $k_{es1}$. These stages correspond to the inner and outer sums of equation (11). In the first stage, the inner sums of equation (11) for each different k' are computed for only the different possible (smaller number of) values of $k_{es2}$. Then, in the second stage, the outer sums of equation (11) for each different k' are computed for the corresponding $k_{es1}$ and $k_{es2}$.

Figure 10A:
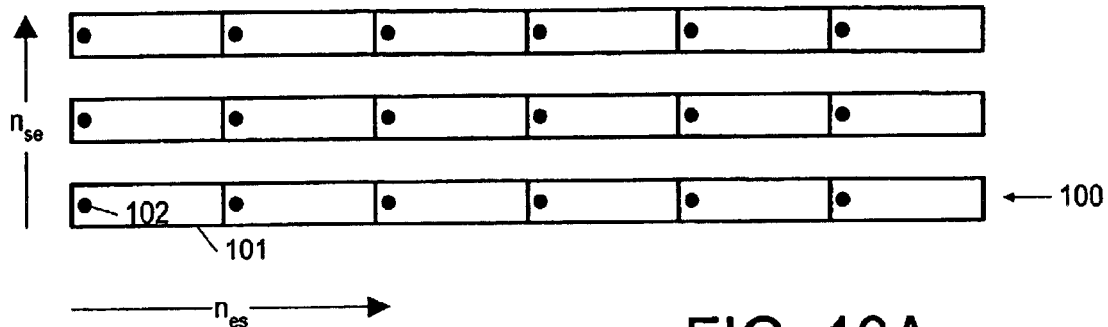
FIG. 10A is a schematic illustration of the outputs of a three-section matched filter for six code periods, indicating in particular the output for a particular code phase in each code period.
Figure 10B:
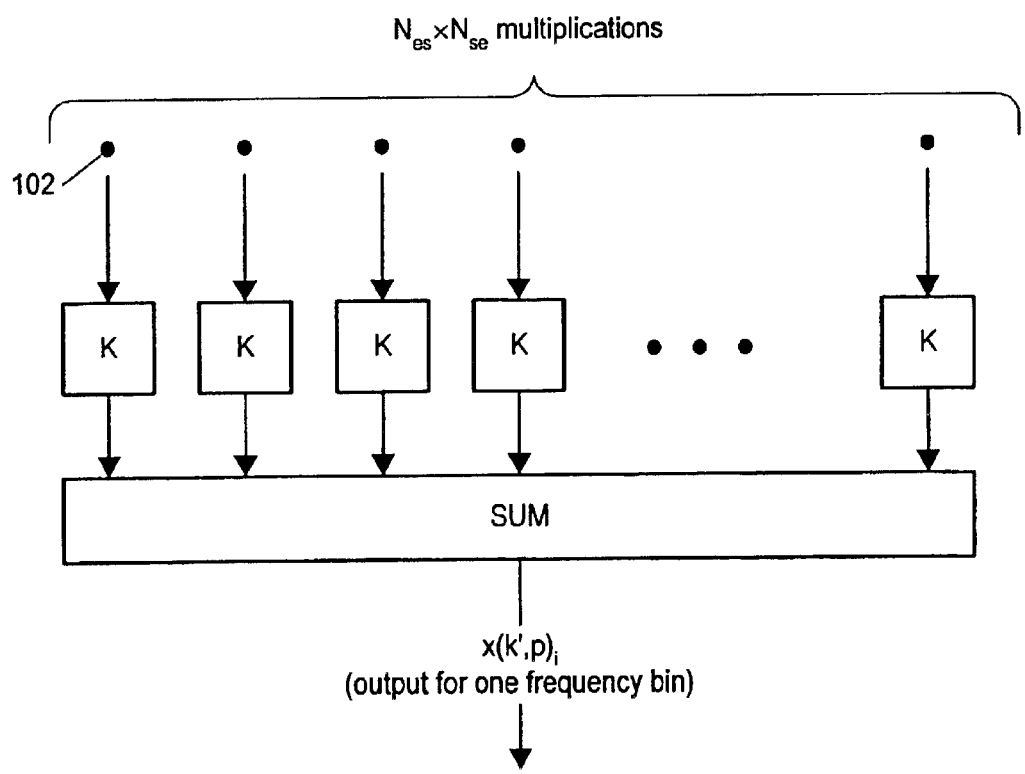
FIG. 10B is a schematic illustration of the processing by the full calculating system for the matched filter outputs indicated in FIG. 10A.
Figure 10C:
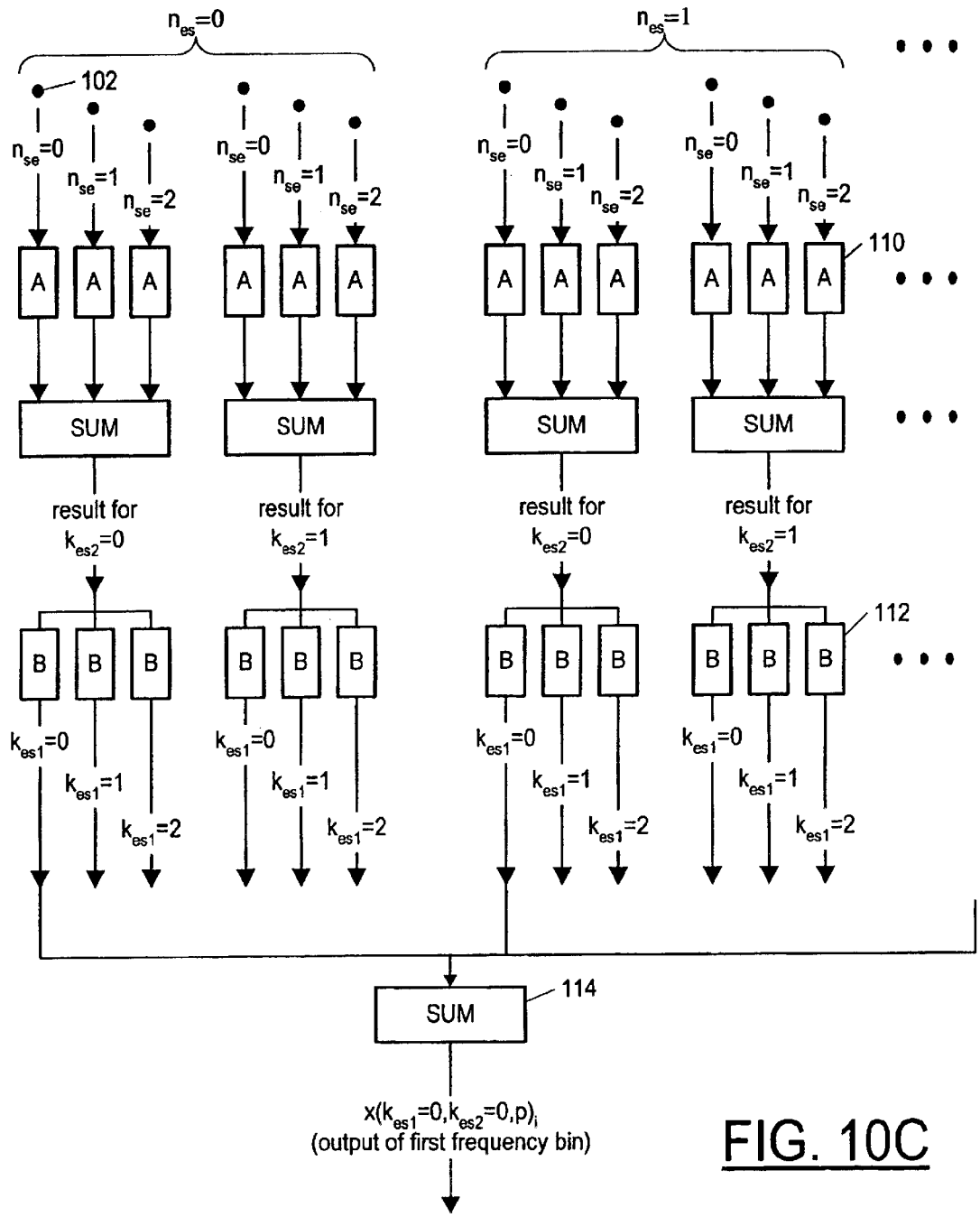
FIG. 10C is a schematic illustration of the processing by the fast calculating system for the matched filter outputs indicated in FIG. 10A.

Referring now to FIGS. 10A, 10B, and 10C, the processing according to the full calculating system is shown (FIG. 10B) compared to that in the fast calculating system (FIG. 10C) for the example of a three-section matched filter providing outputs for six code periods, as indicated in FIG. 10A, and where the number of different values of the fine frequency k' is the same as the number of code periods $N_{es}$ (which is not, in general, required). Referring now in particular to FIG. 10A, the outputs 100 of one section of the matched filter are shown as including six code periods 101. At any one time, the outputs of each section of the matched filter correspond to a particular relative code phase p compared to the received signal, as indicated by the large dot 102 for the code period 101 in the outputs of the first section 100 of the matched filter.

Referring now in particular to FIG. 10B, the processing according to the full calculating system is shown as requiring $N_{es} \times N_{se}$ multiplications for each code phase p, and for each frequency offset k', and so requiring $N_{es}^2 \times N_{se}$ multiplications to determine values for a particular code phase for all frequency bins (in the case where the number of code periods $N_{se}$ is the same as the number of different fine frequency values k', as in the example). Each of the multiplications by the compensating factor for the full calculating system is performed by a module 104 marked K, given by, $$K(n_{es}, n_{se}, k') = e^{-2\pi j k' \frac{n_{se} + n_{es} N_{se}}{N_{se} N_{es}}}.$$

For the example chosen, the number of required multiplications works out to $6^2 \times 3 = 108$.

Referring now in particular to FIG. 10C, two kinds of multiplications are performed in the fast calculating system. In the first stage, the modules 110 marked "A" perform the multiplication using the partial compensating factor, $$A(n_{se}, k_{es2}) = e^{-2\pi j \frac{k_{es2} n_{se}}{N_{se} N_{es2}}}.$$

In the second stage, the modules 112 marked "B" perform the multiplication using the partial compensating factor, $$B(n_{es}, n_{se}, k_{es2}) = e^{-2\pi j \frac{(k_{es1} + k_{es2} N_{es1}) n_{es}}{N_{es}}}.$$

The processing according to the fast calculating system is shown as requiring $N_{se}N_{es2}+N_{es1}N_{es2}$ multiplications for each code phase p, and for each fine frequency k', and so requiring $N_{es}(N_{se}N_{es2}+N_{es1}N_{es2})$ multiplications to determine values for a particular code phase for all frequency bins (in the case where the number of code periods $N_{se}$ is the same as the number of different fine frequency values k', as in the example). Using $N_{es1}N_{es2}=N_{es}$, the required number of multiplications can be expressed as $N_{es}(N_{se}N_{es2}+N_{es})$.

Thus, in the case where the number of different values of the fine frequency k' is chosen to be the same as the number of code periods $N_{es}$ the calculational complexity (expressed in terms of number of operations per set of fine frequencies for any particular code phase) for just the calculation according to equation 6) (i.e. for just coherent combining, not also the optional, non-coherent combining) and for one code phase is $N_{se}N_{es}^2$ operations, while the corresponding calculational complexity using equation (11) is $(N_{se}N_{es}+N_{es})$ operations, which is less than the number of operations required by the full-calculating system, and so can be computed in less time. (A calculation that does not use a multi-segment matched filter to cancel aliasing and compensate for gain loss requires $Ne^2_{es}$ operations per set of fine frequencies for one code phase, and so is able to be performed more quickly than either the calculation according to equations 6) or (11), but suffers from aliasing.)

Scope of the Invention

It is to be understood that the above-described arrangements are only illustrative of the application of the principles of the present invention. In particular, any of the various combining operations indicated as coherent combining can also be any other combining, the number of coherent and non-coherent stages could change, and simple versions of the system could use the fast Fourier transform (FFT) to accelerate computations. Also, some of the computation required by the acquisition according to the present invention could be performed outside of the device receiving the spread spectrum signal, such as by a component of a network using the spread spectrum signaling. In addition, other parallel and sequential architectures are comprehended, and numerous other modifications and alternative arrangements may be devised by those skilled in the art without departing from the spirit and scope of the present invention, and the appended claims are intended to cover such modifications and arrangements.

What is claimed is:

1. An apparatus for acquiring a spread spectrum signal, the signal having a carrier component at a carrier frequency, a code component, and a data component, the acquiring including matching the phase of a replica of the code component to the phase of the received code component and also determining the carrier frequency including any shifting of the carrier frequency, the apparatus comprising:

a) a multi-section matched filter having a plurality of sections, the multi-section matched filter being responsive to a signal derived from the spread spectrum signal by a sequence of processing steps including mixing the spread spectrum signal with a first frequency, for providing successive section outputs for each section, each section output of each section including elements corresponding to a different replica code phase; and b) a compensated acquisition module, responsive to each section output of each of the sections, for providing a sequence of second frequency indicators, each second frequency indicator corresponding to a different frequency offset in a group of frequency offsets from the first frequency, and each section output having elements each of which corresponds to a particular value of replica code phase, wherein each second frequency indicator is based on a combining, phase element-wise, of the section outputs using compensating factors that depend on the corresponding frequency offset.

2. The apparatus as claimed in claim 1, wherein the combining using compensating factors is a combining of the section outputs for only one code period.

3. The apparatus as claimed in claim 1, wherein the combining using compensating factors is a coherent combining of more than one code period of the section outputs.

4. The apparatus as claimed in claim 3, wherein the compensated acquisition module comprises:

a) a coherent combining module, responsive to the section outputs, for combining the section outputs a plurality of times, each combination using different compensating factors based on a frequency offset selected from the group of frequency offsets, to provide one or more successive groups of sequences of compensated sums; and b) a non-coherent combining module, responsive to the one or more groups of sequences of compensated sums, for accumulating, frequency offset-wise, the magnitudes of each element of the one or more successive groups of compensated sums.

5. The apparatus of claim 4, wherein the coherent combining module calculates the successive groups of sequences of compensated sums using the compensating factor, $$e^{-2\pi j k' \frac{n_{se} + n_{es} N_{se}}{N_{se} N_{es}}},$$

where $N_{es}$ is the number of code periods and $n_{es}$ is an index that ranges from 0 to $N_{es}-1$, $N_{se}$ is the number of sections of the matched filter and $n_{se}$ is an index that ranges from 0 to $N_{se}-1$, and where k' indicates the frequency offset and is different for each group of sequences of compensated sums.

6. The apparatus of claim 4, wherein the coherent combining module calculates the successive groups of sequences of compensated sums using the compensating factor, $$e^{-2\pi j \frac{(k_{es1}+k_{es2}N_{es1})n_{es}}{N_{es}}} e^{-2\pi j \frac{k_{es2}n_{es}}{N_{se}N_{es2}}},$$

where $N_{es}$ is the number of code periods and $n_{es}$ is an index that ranges from 0 to $N_{es}-1$, $N_{se}$ is the number of sections of the matched filter and $n_{se}$ is an index that ranges from 0 to $N_{se}-1$, where $k'=k_{es1}+k_{es2}N_{es1}$ in which k' indicates the frequency offset and is different for each group of sequences of compensated sums, a first frequency variable $k_{es1}$ takes on values in the range $-N_{es11}, \ldots, 0, \ldots, N_{es12}$ in which $N_{es11}+N_{es12}+1=N_{es1}$ and a second frequency variable $k_{es2}$ takes on values $-N_{es21}, \ldots, 0, \ldots, N_{es22}$ in which $N_{es21}+N_{es22}+1=N_{es2}$, where $N_{es1} \cdot N_{es2}=N_{es}$.

7. The apparatus of claim 6, wherein the calculation of the compensated sums is organized into a first stage and a second stage, the first stage providing, for a given code phase, a set of first outputs each of which is a summation of the outputs of each section of the matched filter partially compensated by a first partial compensating factor $$e^{-2\pi j \frac{k_{es2}n_{se}}{N_{se}N_{es2}}}$$

the first partial compensation being provided for each $k_{es2}$ in turn, the set of outputs corresponding to each code period, and providing a set of second outputs, each second output corresponding to a particular combination of $k_{es1}$ and $k_{es2}$, and each based on a summation over those outputs in the first stage corresponding to the same value of $k_{es2}$ and modulated by a second partial compensating factor, $$e^{-2\pi j \frac{(k_{es1}+k_{es2}N_{es1})n_{es}}{N_{es}}}.$$

8. The apparatus as claimed in claim 1, wherein the combining using compensating factors is coherent combining.

9. The apparatus as claimed in claim 1, further comprising an analysis module, responsive to the sequence of second frequency indicators, for providing a replica code phase and a corrected carrier frequency.

10. The apparatus as claimed in claim 1, wherein the multi-section matched filter and the compensated acquisition module are co-located in a receiver.

11. The apparatus as claimed in claim 1, wherein the apparatus is a distributed system in that the compensated acquisition module includes computational elements located in a facility separate from the facility or apparatus that hosts the multi-section matched filter.

12. The apparatus of claim 1, wherein the shifting of the carrier frequency is substantially a Doppler shifting.

13. The apparatus of claim 1, wherein the first frequency is a frequency selected from a group of coarse frequencies spanning a range of frequency likely to encompass any frequency-shifted carrier frequency.

14. The apparatus of claim 1, wherein the second frequency indicator corresponds to a fine frequency offset from the first frequency.

15. A method for acquiring a spread spectrum signal, the signal having a carrier component at a carrier frequency, a code component, and a data component, the acquiring including matching the phase of a replica of the code component to the phase of the received code component and also determining the carrier frequency including any shifting of the carrier frequency, the method comprising the steps of:

a) performing a multi-section matched filtering of a digitized signal derived from the spread spectrum signal, to provide successive section outputs for each section, each section output of each section including elements corresponding to a different replica code phase;

b) combining the section outputs for each section to yield a plurality of compensated sums, each compensated sum based on compensating factors depending on a different frequency selected from a group of frequencies.

16. The method of claim 15, wherein the combining in the step of combining the section outputs is a coherent combining.

17. The method of claim 15, further comprising the step of:

c) non-coherently combining one or more groups of compensated sums, each group including compensated sums for a range of different frequencies, the non-coherent combining being a frequency-wise combining of the members in the different groups corresponding to a same frequency, the non-coherent combining providing a sequence of frequency indicators, each corresponding to a different frequency, and each having elements each of which corresponds to a particular code phase.

18. The method of claim 15, wherein the shifting of the carrier frequency is substantially a Doppler shifting.

19. The method of claim 15, wherein the group of frequencies is a group of fine frequency offsets from a coarse frequency selected from a group of coarse frequencies, the group of coarse frequencies spanning a range of frequency likely to encompass any frequency-shifted carrier frequency.

20. A system for receiving a spread spectrum signal, the signal having a carrier component at a carrier frequency, a code component, and a data component, the acquiring including matching the phase of a replica of the code component to the phase of the received code component and also determining the carrier frequency including any shifting of the carrier frequency, the system comprising:

a) an antenna for providing the spread spectrum signal;

b) a carrier mixer for multiplying the spread spectrum signal with a sinusoid at a corrected carrier frequency;

c) a code mixer for multiplying the spread spectrum signal with a replica code at a particular code phase;

d) a module for extracting the data component from the carrier-mixed and code-mixed spread spectrum signal;

e) an RF down-converter and digitizer, for providing a digitized downconverted portion of the spread spectrum signal; and f) an acquirer, including:

i) a multi-section matched filter having a plurality of sections, responsive to a signal derived from the spread spectrum signal by a sequence of processing steps including mixing the spread spectrum signal with a first frequency, for providing of each section including elements corresponding to a different replica code phase; and ii) a compensated acquisition module, responsive to each section output of each of the sections, for providing a sequence of second frequency indicators, each second frequency indicator corresponding to a different frequency offset in a group of frequency offsets from the first frequency, and each having elements each of which corresponds to a particular value of replica code phase, wherein each second frequency indicator is based on a combining, phase element-wise, of the section outputs using compensating factors that depend on the corresponding frequency offset.

21. The system as claimed in claim 20, wherein the combining using compensating factors is a combining of the section outputs for only one code period so as not to perform coherent combining of the section outputs over different code periods.

22. The system as claimed in claim 20, wherein the combining using compensating factors is a coherent combining of more than one code period of the section outputs.

23. The system as claimed in claim 20, wherein the combining using compensating factors is coherent combining.

24. The system as claimed in claim 20, wherein the compensated acquisition module comprises:
   a) a coherent combining module, responsive to the section outputs, for combining the section outputs a plurality of times, each combination using a different compensating factor based on a frequency offset selected from the group of frequency offsets, to provide one or more successive groups of sequences of compensated sums; and
   b) a non-coherent combining module, responsive to the one or more groups of sequences of compensated sums, for accumulating, frequency-wise, the magnitudes of each element of the one or more successive groups of compensated sums.

25. The system as claimed in claim 20, wherein the system is a distributed system in that the compensated acquisition module includes computational elements located in a facility separate from the facility or apparatus that hosts the multi-section matched filter.

26. The system of claim 20, wherein the shifting of the carrier frequency is substantially a Doppler shifting.

27. The system of claim 20, wherein the first frequency is a frequency selected from a group of coarse frequencies spanning a range of frequency likely to encompass any frequency-shifted carrier frequency.

28. The system of claim 20, wherein the second frequency indicator corresponds to a fine frequency offset from the first frequency.

* * * * *

UNITED STATES PATENT AND TRADEMARK OFFICE
CERTIFICATE OF CORRECTION

PATENT NO. : 6,810,072 B1  
DATED : October 26, 2004  
INVENTOR(S) : David Akopian It is certified that error appears in the above-identified patent and that said Letters Patent is hereby corrected as shown below:

<u>Colunm 18,</u>  
Line 57, after "providing" insert -- successive section outputs for each section, each section output --.

Signed and Sealed this

Fifteenth Day of March, 2005

JON W. DUDAS  
*Director of the United States Patent and Trademark Office*